United States Patent
Mufti

4,087,741
May 2, 1978

[54] DOWNHOLE GEOELECTRIC REMOTE SENSING METHOD

[75] Inventor: Irshad R. Mufti, Tulsa, Okla.

[73] Assignee: Standard Oil Company (Indiana), Chicago, Ill.

[21] Appl. No.: 717,307

[22] Filed: Aug. 24, 1976

[51] Int. Cl.² .............................................. G01V 3/18
[52] U.S. Cl. ....................................................... 324/10
[58] Field of Search ..................................... 324/1, 10

[56] References Cited
U.S. PATENT DOCUMENTS

| | | | |
|---|---|---|---|
| 2,754,475 | 7/1956 | Norelius | 324/10 X |
| 2,782,364 | 2/1957 | Shuler et al. | 324/10 X |
| 2,884,589 | 4/1959 | Campbell | 324/1 |
| 2,920,266 | 1/1960 | Owen | 324/10 X |
| 2,941,784 | 6/1960 | Martin | 324/10 |
| 3,076,138 | 1/1963 | Stelzer | 324/10 X |
| 3,256,480 | 6/1966 | Runge et al. | 324/10 |
| 3,697,864 | 10/1972 | Runge | 324/10 |
| 3,778,701 | 12/1973 | Runge | 324/10 |
| 3,838,335 | 9/1974 | Miller | 324/10 |

*Primary Examiner*—Gerard R. Strecker
*Attorney, Agent, or Firm*—Albert C. Metrailer; Arthur McIlroy

[57] ABSTRACT

A simple geoelectric remote sensing cable comprising a single current electrode and a relatively large number of sensing, or potential, electrodes. The current electrode is at the center of the logging cable and the sensing electrodes are arranged symmetrically about the current electrode in such a manner that the spacing between adjacent sensing electrodes increases with distance from the current electrode. In the preferred embodiment, the sensing electrode spacings are all integral multiples of a basic interval unit, such as two and one-half feet. The cable is pulled from the bottom of a borehole to the top at a fixed rate while a fixed current is supplied to the current electrode and the voltage differences between each adjacent pair of sensing electrodes are recorded after each movement of a distance equal to the basic interval or an integral fraction thereof. In the preferred embodiment, four-point electrode type of resistivity calculations are then made using the recorded data and the superposition principle.

4 Claims, 2 Drawing Figures

DOWNHOLE GEOELECTRIC REMOTE SENSING METHOD

BACKGROUND OF THE INVENTION

This invention relates to downhole resistivity logging methods and apparatus and, more particularly, to downhole resistivity logging apparatus for remote sensing of resistive or conductive anomalies at a distance from the borehole.

Electrical logging of boreholes is well known and has become a standard practice. The measurement of electrical resistivity in a borehole has been used to determine formation characteristics, both near and far from the borehole. As the resistivity measuring tools and apparatus have been improved, the depth of measurement into the formation has been increased in an effort to locate possible petroleum-containing formations which have been missed by the wellbore itself.

One example of an electrical logging device intended primarily for the location of a salt dome missed by the borehole is found in U.S. Pat. No. 3,256,480 issued to Runge et al. on June 14, 1966. The logging device described in this patent is known as a normal electrode configuration having a current input electrode at the lowest point of the device and a series of sensing electrodes spaced at approximately exponentially increasing spacings above the current electrode and over a distance of from 200 to 1,000 feet. The return current electrode in this normal electrode configuration is an earth contact at the surface of the earth. The disclosed device typically has six sensing electrodes and is used to detect a salt dome by comparing the apparent resistivity measured at each of the electrodes to an averaged or composite resistivity generated from short-spaced electrode measurements or some other short-range logging device. A difference in the apparent resistivity measured by a particular electrode and the average resistivity is an indication of a salt dome at a distance corresponding to the particular electrode spacing.

Another resistivity logging device also intended for locating a salt dome is disclosed in U.S. Pat. No. 3,697,864 issued to Runge on Oct. 10, 1972. The logging cable disclosed in this patent is essentially a very long version of a common four-point resistivity measuring device. It has two current electrodes spaced apart on the order of 1,000 feet and two voltage sensing electrodes spaced symmetrically between the two current electrodes. Voltage measurements taken by the two sensing electrodes in this long four-point array are used with a well-known mathematical formula to generate an apparent resistivity measurement which is again compared to a composite resistivity measurement derived from short-spaced electrode measurements or other short-range electrical resistivity measurements. If the two measurements differ significantly, a large resistivity anomaly such as a salt dome is indicated at a distance from the wellbore on the order of the electrode spacings.

Yet another resistivity measurement device used primarily to detect horizontal anomalies such as pools of oil near vertical anomalies such as salt domes is disclosed in U.S. Pat. No. 3,778,701 issued to Runge on Dec. 11, 1973. This apparatus has a single downhole current electrode and a second current electrode contacting the earth's surface. It also has two sensing electrodes with one spaced above the downhole current electrode and the other below it by the same distance. With this device, the voltage between the two sensing electrodes is essentially zero, except when the device is near a horizontal anomaly such as a pool of oil.

A mathematical description of multiple-point electrode logging devices is provided by the reference: "A Systematic Theoretical Description of Multiple-Point Electrode Logging Devices. The Zoom-Log," by J. M. Lepa, W. F. Kozik, and S. Plewa; Acta Geophys. Pol., Vol. 19, No. 2, pp. 149–165, 1971. This reference provides mathematical descriptions of logging devices having from one to five current electrodes. It additionally illustrates the use of superposition of potential fields to analyze these various logging devices. As proposed by this reference, it is possible to generate the resistivity measurements of various complex logging devices by appropriately combining readings taken with a number of simpler logging devices. The "zoom log" proposed by this reference is a complicated five current electrode device which can provide a depth of investigation which is variable by means of current ratio adjustment. It is suggested that a more practical means of achieving the desired results is to provide six measurements taken by simpler devices and to mathematically combine these six measurements in a computer program to obtain the "zoom log" measurements.

In those electrical logging devices which have only one downhole current electrode and a return electrode at the earth's surface, large volumes of the earth are energized. Consequently, voltages measured at sensing electrodes reflect not only the influence of anomalous structures of interest but also of subsurface materials of no economic significance. This amounts to a lack of resolution in such devices.

In those electrical logging devices which have both current electrodes downhole and relatively close together, the volume of the earth affected by the energizing current is reduced. This arrangement causes another problem in that there must generally be a fixed spacing between the current electrodes and the data obtained, therefore, reflects variations in resistivity corresponding to a fixed depth of penetration as determined by the current electrode spacing. It is possible to have more than one pair of downhole electrodes, as is done in the above references U.S. Pat. No. 3,697,864, but this requires the addition of electrodes and conductors capable of carrying the survey current so that it is not practical to expand the range of investigation to any great extent in this manner.

The "zoom log" disclosed in the above referenced technical article can provide a continuous curve of resistivity as a function of depth of investigation, but requires a complex logging tool in terms of number of current electrodes and regulated variable current sources. The alternate "zoom log" arrangement is apparently either a logging tool which can simultaneously provide six simpler logging measurements using a plurality of current inputs or six separate logging devices which must be run in the borehole on separate logging runs.

Accordingly, an object of the present invention is to provide an improved resistivity logging device and method for geoelectric remote sensing.

Another object of the present invention is to provide a simple resistivity logging device having a single downhole current electrode.

Another object of the present invention is to provide a resistivity logging device and method for measuring formation resistivity over a broad and virtually continuous range of depths of investigation.

Another object of the present invention is to provide a downhole resistivity logging device and method which can provide formation resistivity measurements over an essentially continuous range of borehole locations.

Yet another object of the present invention is to provide a downhole resistivity logging device and method for making high resolution measurements of the distance to and shape and resistivity of geologic structures either penetrated or missed by the borehole.

These and other objects are achieved by providing a resistivity logging cable comprising a single current electrode at the center of the logging device and two arrays of voltage sensing electrodes spaced symmetrically above and below the current electrode. A return path for the current electrode is provided by a surface earth contact. The voltages between adjacent pairs of sensing electrodes are recorded while a very low frequency current is supplied to the formation from the current electrode. Apparent resistivity is then determined using the four-point resistivity equation by algebraically adding the voltage difference between a pair of sensing electrodes above the current electrode with the voltage difference between a pair of electrodes the same distance below the current electrode, but measured at a later time when the lower electrode pair is moved to the same position as the upper electrode pair had occupied. By thus composing the recorded measurements, the advantages of having two downhole electrodes are achieved in a device having only one downhole electrode.

BRIEF DESCRIPTION OF THE DRAWINGS

The present invention may be more fully understood by reading the following detailed description of the preferred embodiments with reference to the accompanying drawings wherein.

DESCRIPTION OF THE PREFERRED EMBODIMENTS

Figures 1, 2:
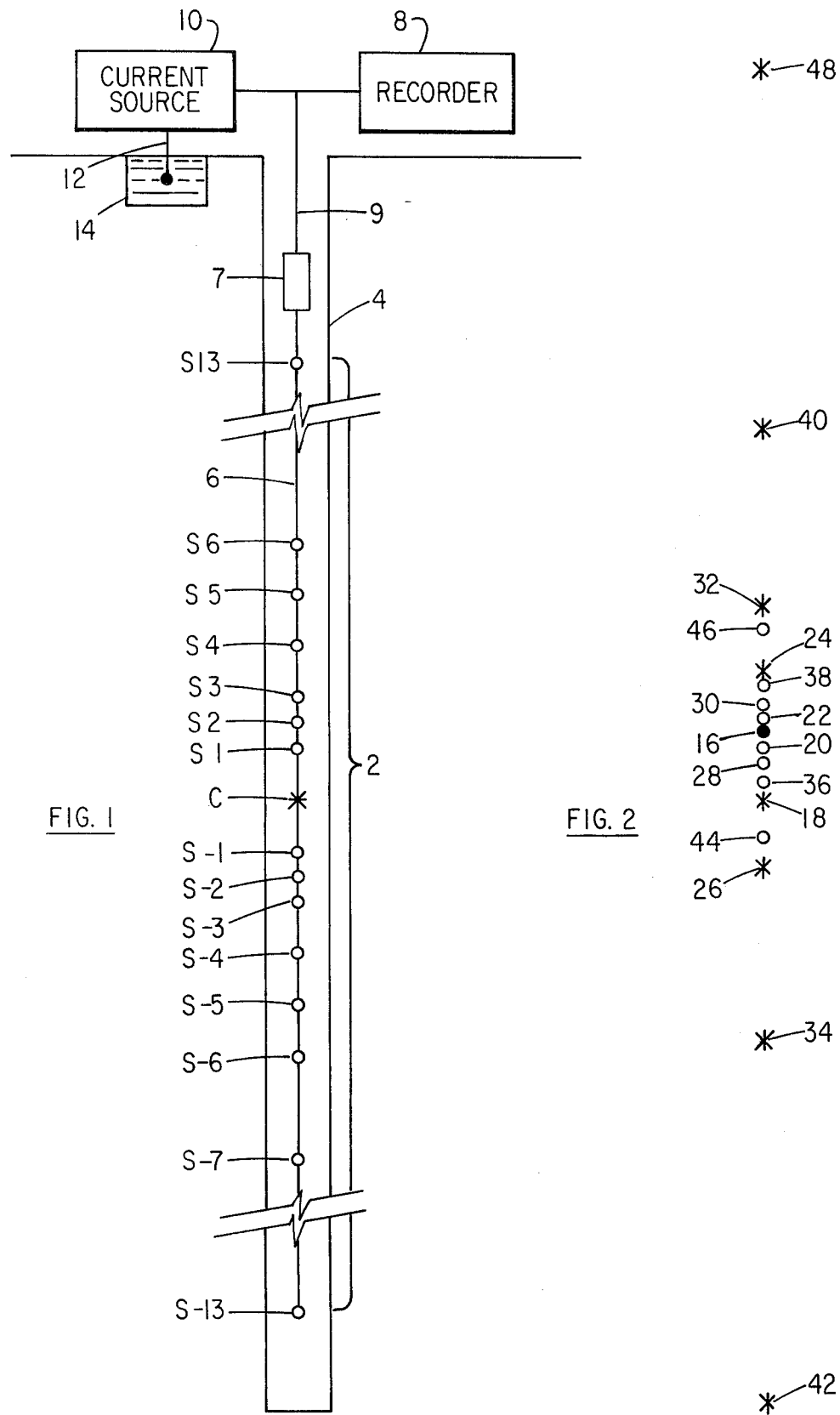
FIG. 1 is a cross sectional view of a borehole in the earth with a logging tool according to the present invention suspended therein.
FIG. 2 is an illustration of various current and sensor electrode positions relative to a selected measurement station.

With reference now to FIG. 1, there is illustrated a logging device 2 suspended in a borehole 4. Logging device 2 comprises a multiconductor cable 6 having a single current electrode C at its center and, in the preferred embodiment, having 26 voltage sensing electrodes arranged in two symmetrical 13-electrode arrays above and below current electrode C. The sensing electrodes above current electrode C are designated S1 through S13 with distance above electrode C increasing with the designation number. Likewise, the sensing electrodes below current electrode C are designated S-1 through S-13 with the distance from current electrode C increasing with the designation number. The actual distances in feet from the current electrode C to each of the sensing electrodes S1 through S13 are given in Table 1. Since the distances from the current electrode C to sensing electrodes S-1 through S-13 are the same as those shown in Table 1, a separate table for the lower electrode array is not provided.

TABLE 1

| SENSOR ELECTRODE SPACINGS | |
|---|---|
| SENSOR | DISTANCE FROM CURRENT ELECTRODE |
| S1 | 10 ft |
| S2 | 15 ft |
| S3 | 20 ft |
| S4 | 30 ft |
| S5 | 40 ft |
| S6 | 50 ft |
| S7 | 70 ft |
| S8 | 90 ft |
| S9 | 110 ft |
| S10 | 150 ft |
| S11 | 190 ft |
| S12 | 230 ft |
| S13 | 310 ft |

The cable 6 includes at least 27 individually insulated conductors and a tension member for supporting the weight of the cable itself and the attached electrodes. One of the conductors is connected to the current electrode C and is large enough to carry the typical logging current on the order of two amperes. The other 26 conductors may be smaller since they carry only detected voltages from the 26 sensor electrodes to the surface and conduct negligible current. The details of construction of such cables are well known in the art and will not be further discussed here.

In the preferred embodiment, the logging cable 6 ends just above electrode S13 where it is coupled to a multiplexer unit 7. Multiplexer 7 is, in turn, connected at its upper end to a standard seven-conductor logging cable 9 which extends to the surface of the earth for providing mechanical support for logging cable 2 as well as conducting electrical signals from the surface equipment to the downhole equipment. At the surface, the cable 9 is connected to a recorder 8 and a current source 10. The conductor of cable 6 which is connected to current electrode C is connected through multiplexer 7 and cable 9 to an output of current source 10, which provides a low frequency signal on the order of one hertz at a current of about two amperes to the current electrode C. A return current path is provided to current source 10 by a second lead 12 which is connected to an earth contact such as a mud pit 14. Such an earth contact is typically used when a well is being drilled, but other earth contacts may be used. The current level and frequency supplied by source 10 in the preferred embodiment is typical of other long range logging devices and may be varied over wide ranges as desired, but of course must be kept constant during the logging of any given borehole.

The leads in cable 6 which are connected to the 26 voltage sensing electrodes are connected in pairs to the inputs of 24 differential voltage sensors, such as solid state differential amplifiers. The outputs of the voltage sensors are coupled sequentially to an analog-to-digital converter which has an output coupled through one of the conductors of cable 9 to the recording input of tape recorder 8. Since the voltages on sensor electrodes are sequentially sampled and transferred serially to the input of recorder 8, it is, in the preferred embodiment, a simple single track recorder. This sampling and serial recording method provides an efficient use of the recording tape. As will be explained below, the sampling period is on the order of one second during which time the logging cable moves less than the length of the typical sensing electrode so that essentially no resolution is lost by transferring samples to the surface equipment over a period of about one-half second. If it is desired that all voltages be sampled at precisely the same time, then differential input sample and hold circuits may be used in place of the simpler differential amplifiers. The same effect could also be achieved by making stationary measurements but in most cases this option is not reasonable due to the increased time required and resulting downtime of the well.

In operation, the logging device 2 is lowered into a borehole until electrode S-13 is at the bottom of the borehole. Current source 10 is then activated to provide, in the preferred embodiment, a squarewave, two-ampere current at 1 Hz. The logging cable is then raised in the borehole at the rate of 30 feet per minute, or one-half foot per second, and the recorder 8 begins recording samples taken at each one-half foot interval in synchronization with the movement of the logging tool. As will be noted from Table 1, this one-half foot sample spacing corresponds to one-tenth the minimum distance between sensor electrodes, such as electrodes S1 and S2. When current electrode C reaches the top of borehole 4, recorder 8 is stopped and the logging run is complete. The information stored by recorder 8 in a single logging run as above described is sufficient to determine formation resistivity over an essentially continuous range of depths of investigation at points in the borehole spaced one-half foot apart.

With the electrode spacings of Table 1, sensor electrode potentials must be sampled at least every two and one-half feet to provide samples which may be combined or composed properly. This minimum spacing corresponds to one-half the minimum distance between adjacent sensing electrodes, such as S1 and S2. The reason for this minimum sampling rate may be understood by considering the method of calculating apparent resistivity by combining the sampled voltages as explained below. The preferred embodiment sampling rate of one-half foot is five times the minimum and provides readings at more measurement stations which makes it easier to identify faulty readings.

FIG. 2 illustrates how the information recorded by recorder 8 is combined to provide resistivity measurements. For a given measurement station 16, four examples are provided. A standard four-electrode resistivity measurement can be made at station 16 when current electrodes are at positions 18 and 24 and sensing electrodes are at positions 20 and 22 about station 16 as illustrated in FIG. 2. The logging tool of the present invention provides the same information in the following manner. When current electrode C of FIG. 1 is at position 18, voltage sensing electrodes S1 and S2 are located at positions 20 and 22, respectively. When current electrode C is at position 24, sensing electrodes S-2 and S-1 are at positions 20 and 22, respectively. Current electrode positions 18 and 24 are two of the points at which electrode potential differences are sampled and recorded by recorder 8 of FIG. 1. A four-point electrode resistivity calculation is made by algebraically adding the potential difference between electrodes S2 and S1 measured when electrode C was at position 18 to the potential difference between electrodes S-1 and S-2 when current electrode C is at position 24. After this algebraic summation is made, the resistivity may be calculated in exactly the same manner as if an actual four-point electrode array had been placed at positions 18, 20, 22, and 24 and the potential difference between electrodes at positions 20 and 22 had been measured while a known current equal to that supplied by source 10 was passed between electrodes at positions 18 to 24.

The composing of measurements to make a four-point resistivity calculation can best be understood by an example based upon the above example. The well known formula for relating resistivity to the four-point electrode measurement may be written for current electrodes at positions 18 and 24, and sensing electrodes at positions 20 and 22, as follows:

$$\Delta V = \frac{I\rho}{4\pi} \left[ \left( \frac{1}{R(C18,P20)} - \frac{1}{R(C24,P20)} \right) - \left( \frac{1}{R(C18,P22)} - \frac{1}{R(C24,P22)} \right) \right] \quad (1)$$

where: R(Cxx,Pyy) is the distance between current electrode position xx and potential, or sensing, electrode position yy;

I is the current flowing between current electrodes;

$\pi$ is the apparent resistivity; and $\Delta V$ is the voltage measured between the sensing electrodes. The following two equations are derived from equation (1) by assuming that one or the other of the two current electrodes is an infinite distance from the other electrodes:

$$\Delta V' = \frac{I\rho}{4\pi} \left( \frac{1}{R(C18,P20)} - \frac{1}{R(C18,P22)} \right) \quad (2)$$

$$\Delta V'' = \frac{I\rho}{4\pi} \left( \frac{1}{R(C24,P20)} - \frac{1}{R(C24,P22)} \right) \quad (3)$$

where:

V' is the voltage between sensor electrodes when the upper current electrode is at infinity, that is at the earth's surface; and V" is the voltage between sensor electrodes when the lower current electrode is at infinity.

It may then be seen by comparing equations (1), (2) and (3) that:

$$\Delta V = \Delta V' - \Delta V'' \quad (4)$$

It can be seen that the voltage measured between electrodes S1 and S2 when current electrode C was at position 18 is the voltage $\Delta V'$ and that the voltage measured between electrodes S-1 and S-2 when electrode C was at position 24 is the voltage $\Delta V''$. Thus, the voltage $\Delta V$ needed in equation (1) is obtained by combining the voltages $\Delta V'$ and $\Delta V''$ according to equation (4). The test current is known and the interelectrode distances of equation (1) are known so that the apparent resistivity may then be calculated.

A second four-point electrode array having a deeper depth of investigation at measurement station 16 is illustrated by current electrode positions 26 and 32 and sensing electrode positions 28 and 30. The exact equivalent of this four-point array is again generated by the present invention in the following manner. When current electrode C of FIG. 1 is at position 26, voltage sensing electrodes S3 and S4 are located at positions 28 and 30, respectively. When current electrode C is at position 32, voltage sensing electrodes S-3 and S-4 are at positions 30 and 28, respectively. Voltages measurements are then combined algebraically as explained above to provide the same information as an actual four-point array positioned at locations 26, 28, 30, and 32 would provide.

The need for sampling voltages at the minimum two and one-half foot spacings can be seen from the above two examples and the spacings listed in Table 1. Current electrode position 18 must be 12½ feet from measurement station 16 for sensing electrodes S1 and S2 to be at positions 20 and 22. Current electrode position 26 must be 25 feet from measurement station 16 for sensing electrodes S3 and S4 to be at positions 28 and 30. The difference between current electrode positions 18 and 26 is therefore 12½ feet which is two and one-half times the minimum spacing between sensing electrodes. By taking measurements at the 2½ foot intervals, measurements at both current positions 26 and 18 are assured. Readings may be taken at smaller intervals, as in the preferred embodiment, as long as the smaller interval is an integral fraction of the minimum spacing.

Yet another four-point electrode array is illustrated by current electrode positions 34 and 40 and voltage sensing electrode positions 36 and 38. This four-point array is again simulated by the present invention by recording the potential between electrodes S6 and S7 when current electrode C is in position 34 and by recording the potential between electrodes S-6 and S-7 when current electrode C is at position 40. These two readings are also combined and used in the four electrode formula as explained above.

The fourth example having current electrodes at positions 42 and 48 and voltage sensing electrodes at positions 44 and 46 provides an even greater depth of investigation at measurement station 16. This four-point electrode array is simulated by the present invention by recording the potential between electrodes S9 and S10 at positions 44 and 46, respectively, when current electrode C is at position 42, and recording the potential between electrodes S-9 and S-10 at positions 46 and 44, respectively, when current electrode C is at position 48. These measurements are again combined algebraically to provide the same measure of apparent resistivity that an actual four-point electrode array at positions 42, 44, 46, and 48 would provide.

While resistivity measurements for four depths of investigation at measurement station 16 have been described, it is apparent that for the preferred embodiment electrode array having thirteen electrodes on either side of the current electrode a total of twelve such measurements may be calculated from the information recorded by recorder 8. The information needed for these calculations is the electrode potential differences which occur when each pair of sensing electrodes is centered on a selected measurement station. Since the closest spaced electrodes such as S1 and S2 are 5 feet apart, voltage samples are taken at least every 2½ feet to insure that the potentials necessary for composing the effect of an expanding current dipole are recorded. When this minimum 2½ foot sampling interval is used, measurement stations occur every 2½ feet along the borehole. The one-half foot sampling rate of the preferred embodiment provides measurement stations every one-half foot. Thus, while FIG. 2 illustrates only four different resistivity measurements at a single measurement station, it is apparent that the logging tool of FIG. 1 generates enough information in a single logging run to provide thousands of such measurements; that is, 12 such measurements for each one-half foot interval of the borehole. A practical use may be made of these resistivity measurements by plotting them as a series of curves, one for each one-half foot borehole interval, with each curve being a plot of resistivity versus depth of investigation. A similar method of plotting resistivity data is illustrated in U.S. Pat. No. 2,963,640 issued to G. O. Buckner, Jr., on Dec. 6, 1960. Resistive or conductive anomalies will appear as deviations in the individual plots and can be traced over vertical depth by observing the range of borehole intervals over which deviations at given depths of investigation appear. It is anticipated that, in practice, plots for each one-half foot interval will not be made due to the number of plots which would result. Instead, plots for each 2½ foot interval will be made and the "extra" readings will probably be used to null out transient errors in the readings by appropriate averaging methods.

In this preferred embodiment, the spacing which corresponds to the two positions of the current electrode used for composing the current dipole effect is, in general, significantly greater than the corresponding spacing between sensor electrodes. Thus, for example, the spacing between the current electrode positions 42 and 48 of FIG. 2 is much larger than the spacing between corresponding sensor electrode positions 44 and 46. Such an arrangement permits sampling the earth through narrow "windows" or, in other words, permits high resolution sampling. Such high resolution sampling has not been possible with most prior art devices such as those disclosed in the above referenced patents.

It is apparent that the above described four-point electrode resistivity measurements include those provided by the above referenced U.S. Pat. No. 3,697,864, but that the present invention provides more such measurements for each measurement station with higher resolution and does so using a single downhole current electrode. It is also apparent that by using one or more absolute voltage measurements and the information stored by recorder 8 of FIG. 1, the exploration method described in above referenced U.S. Pat. No. 3,256,480 may be practiced. In addition, the exploration method described in above referenced U.S. Pat. No. 3,778,701 may be practiced by use of voltage measurements relative to earth or electrode C and the information stored in recorder 8. Thus, it is seen that when the measurements taken by the logging tool of the present invention are properly combined according to the rules of superposition, a wide variety of downhole resistivity exploration techniques may be practiced with a single downhole logging tool having a single current electrode, although the high resolution, four-electrode method described herein is preferred.

Many modifications of the preferred embodiment of the present invention will be apparent to those skilled in the art. It is a simple matter to increase the maximum range of exploration of the preferred embodiment logging tool by adding more electrodes at approximately exponentially increasing spacings above and below current electrode C. Additional electrodes may be added to the array for making self potential measurements or other known electrical logging measurements for correlation with the log of the present invention. A half array consisting of another current electrode and thirteen more sensing electrodes may be added in the array, with the added current electrode at the lowest point on the cable, so that logging according to the present invention may be done to the very bottom of the borehole, although this modification will not produce a complete dipole effect. It is also possible to use the potential differences between nonadjacent sensing electrodes (for example, between electrodes S2 and S5) in making resistivity calculations other than those described above. It is also possible to use sensing electrode spacings other than the simple multiples of the basic interval, which was five feet in the preferred embodiment, as long as the electrodes above and below the current electrode are symmetrical so that voltages which are to be combined are measured by sensing electrodes having essentially identical spacings to avoid the need for interpolation. Although the present invention has been illustrated in terms of specific apparatus, it is apparent that other changes and modifications can be made without departing from the spirit and scope of the invention as defined by the appended claims.

I claim:

1. A method of exploring for electrically resistive geological anomalies lateral to but not penetrated by a borehole comprising:

traversing the borehole with an electrode array comprising a current electrode for passing current into earth formations cut by the borehole and a plurality of upper and a plurality of lower voltage sensing electrodes positioned above and below, respectively, the current electrode, passing current into the earth formations by means of the current electrode and a ground electrode at the earth's surface;

recording the potential differences induced by said current in the formations between each adjacent pair of said upper and lower voltage sensing electrodes at each of a plurality of positions of said electrode array in the borehole, and combining a first potential difference from said upper voltage sensing electrodes recorded at a first of said electrode array positions with a second potential difference from said lower voltage sensing electrodes recorded at a second of said electrode array positions to obtain a potential difference from which a symmetrical formation resistivity value may be determined.

2. A method of exploring for electrically resistive geological anomalies according to claim 1 wherein said upper and lower voltage sensing electrodes are symmetrically spaced about the current electrode and the voltage sensing electrodes are spaced apart by distances which are integral multiples of a preselected minimum electrode spacing and said spacing increases with distance of the voltage sensing electrodes from the current electrode.

3. A method according to claim 2 wherein the voltage sensing electrode potential differences are recorded at electrode array positions which are spaced apart in the borehole by one-half the preselected minimum electrode spacing.

4. A method according to claim 2 wherein said first and second potential differences are recorded from electrode pairs which are spaced symmetrically about said current electrode and said first and second electrode array positions are selected so that said first and second potential differences are recorded at substantially the same borehole position and said first and second potential differences are combined by algebraic summation.

* * * * *